US012573858B2

(12) United States Patent
Berning et al.

(10) Patent No.: US 12,573,858 B2
(45) Date of Patent: Mar. 10, 2026

(54) POWER SUPPLY SYSTEM

(71) Applicant: instagrid GmbH, Ludwigsburg (DE)

(72) Inventors: Sebastian Berning, Stuttgart (DE);
Philipp Gutknecht, Monsheim (DE);
Raphael Zürner, Ludwigsburg (DE)

(73) Assignee: instagrid GmbH, Ludwigsburg (DE)

( * ) Notice: Subject to any disclaimer, the term of this
patent is extended or adjusted under 35
U.S.C. 154(b) by 788 days.

(21) Appl. No.: 17/737,400

(22) Filed: May 5, 2022

(65) Prior Publication Data

US 2022/0360094 A1 Nov. 10, 2022

(30) Foreign Application Priority Data

May 6, 2021 (DE) .................... 10 2021 111 861.1

(51) Int. Cl.
*H02J 7/00* (2006.01)
*B60L 3/00* (2019.01)
*B60L 53/14* (2019.01)
*B60L 53/24* (2019.01)
*B60L 55/00* (2019.01)
(Continued)

(52) U.S. Cl.
CPC .......... *H02J 7/0024* (2013.01); *B60L 3/0046*
(2013.01); *B60L 53/14* (2019.02); *B60L 53/24*
(2019.02); *B60L 55/00* (2019.02); *H01M*
*50/204* (2021.01); *H01M 50/502* (2021.01);
*H02J 7/00304* (2020.01); *H02J 7/0068*
(2013.01); *H02J 7/007* (2013.01); *B60L*
*2210/40* (2013.01)

(58) Field of Classification Search
CPC ........ B60L 3/0046; B60L 53/14; B60L 53/24;
B60L 55/00; B60L 2210/40; H01M
50/204; H01M 50/502; H02J 7/0024;
H02J 7/00304; H02J 7/0068; H02J 7/007
USPC ........................................................ 320/116
See application file for complete search history.

(56) References Cited

U.S. PATENT DOCUMENTS

| | | | |
|---|---|---|---|
| 3,867,643 | A | 2/1975 | Baker et al. |
| 5,642,275 | A | 6/1997 | Peng et al. |
| 8,994,336 | B2 | 3/2015 | Brotto et al. |

(Continued)

FOREIGN PATENT DOCUMENTS

| | | |
|---|---|---|
| CN | 110605979 A | 12/2019 |
| DE | 102011004248 A1 | 8/2011 |

(Continued)

*Primary Examiner* — Zixuan Zhou
(74) *Attorney, Agent, or Firm* — The Webb Law Firm

(57) ABSTRACT

A power supply system with a large number of battery modules, wherein each battery module has a first electrical connection and a second electrical connection, via which the battery modules are connected in series in an interconnection branch of the power supply system. Each battery module also has an accumulator which can be connected via a bridge circuit of the battery module to the first electrical connection and the second electrical connection, and to a charging path via which the power supply system can be charged, and to a discharging path via which the power supply system can deliver electrical power to a connected consumer. The power supply system has a switching component to which the charging path, the discharging path and the interconnection branch are connected, and wherein the switching component can connect the charging path and/or the discharging path electrically conductively to the interconnection branch.

29 Claims, 2 Drawing Sheets

(51) Int. Cl.
  *H01M 50/204*   (2021.01)
  *H01M 50/502*   (2021.01)

(56)     References Cited

U.S. PATENT DOCUMENTS

| | | | | |
|---|---|---|---|---|
| 2004/0008009 | A1 | 1/2004 | Fukaya | |
| 2004/0062059 | A1* | 4/2004 | Cheng | H02J 5/00 |
| | | | | 363/17 |
| 2010/0019569 | A1* | 1/2010 | Izumi | B60L 58/20 |
| | | | | 307/9.1 |
| 2016/0190864 | A1* | 6/2016 | Yeon | H02J 9/062 |
| | | | | 307/66 |
| 2017/0310143 | A1* | 10/2017 | Mazzola | H02M 3/335 |
| 2019/0074713 | A1* | 3/2019 | Chou | H02J 9/061 |
| 2020/0203957 | A1* | 6/2020 | Jin | H02J 7/00306 |

FOREIGN PATENT DOCUMENTS

| | | | | | |
|---|---|---|---|---|---|
| DE | 102017209451 | A1 | 12/2018 | | |
| DE | 102018124789 | A1 | 4/2020 | | |
| DE | 102019110177 | A1 * | 10/2020 | | H02J 9/005 |

* cited by examiner

6

POWER SUPPLY SYSTEM

CROSS-REFERENCE TO RELATED APPLICATIONS

This application claims priority to German Patent Application No. 10 2021 111 861.1, filed on May 6, 2021, the contents of which are hereby incorporated by reference in their entirety.

TECHNICAL FIELD

The disclosure relates to a power supply system. Combustion engines are predominantly used today for the mobile supply of high-performance machines and vehicles, particularly those with an output power of more than 1 kW. In order to reduce environmental pollution and health impairment due to exhaust gases and noise, such power supply systems are increasingly being replaced by those based on battery storage.

BACKGROUND

For many applications, it is advantageous if such a power supply system can provide an AC voltage. Consumers that are suitable for operation with a conventional mains AC voltage or electric motors such as 3-phase asynchronous machines are given as an example. Furthermore, it is desirable for high-power consumers to provide the highest possible supply voltage in order to keep required operating currents and thus also electrical losses small. An example of this is the Central European mains AC voltage of 230 V with a peak value of 325 V or the typical voltage of 400 V for mobile electric drives.

In order to generate an AC voltage from a DC voltage of a power supply system with battery storage, an electrical converter is required. So-called two- or three-point inverters are almost exclusively used here today, which generate a 1- or 3-phase, sinusoidal output voltage from an intermediate circuit voltage (battery voltage) by chopping and smoothing.

U.S. Pat. No. 3,867,643 A describes an alternative electrical converter in which multi-stage conversion takes place. A large number of direct current sources, for example batteries, are each periodically connected in series in the current path or bridged by a bridge circuit, so that the resulting output voltage assumes an approximately sinusoidal curve. Document U.S. Pat. No. 5,642,275 A details the implementation of this converter technology with battery modules, each battery module having at least one direct current source and a bridge circuit. Such converters are often referred to in the literature as "cascaded multilevel inverter/converter" or "modular multilevel inverter/converter". Converters of this type have proven to be advantageous compared to two-point or three-point converters, particularly with regard to costs, thermal losses and size.

SUMMARY

It should be possible for such a power supply system both to provide electrical power to a consumer and to draw power from a supply network, for example. The disclosure is therefore based on providing a power supply system with a "cascaded multilevel inverter/converter" that can carry out both a charging process and a discharging process, and in which a change between the charging process and the discharging process can be easily accomplished.

This achieved by specifying the power supply system according to claim 1. The subclaims relate to various advantageous developments of the present disclosure that are independent of one another, the features of which can be freely combined with one another by a person skilled in the art within the scope of what is technically reasonable. The disclosure relates to a power supply system with a large number of battery modules, wherein each battery module has a first electrical connection and a second electrical connection, via which the battery modules are connected in series in an interconnection branch of the power supply system, wherein each battery module also has an accumulator which can be connected via a bridge circuit of the battery module to the first electrical connection and the second electrical connection, and to a charging path via which the power supply system can be charged, and to a discharging path via which the power supply system can deliver electrical power to a connected consumer, wherein the power supply system has a switching means to which the charging path, the discharging path and the interconnection branch are connected, and wherein the switching means can connect the charging path and/or the discharging path electrically conductively to the interconnection branch.

Such a device can be charged directly from an AC voltage source and can also provide a consumer with electrical power in the form of AC voltage. It is possible to generate an AC voltage by means of a suitable control of the bridge circuits in the battery modules. Depending on the switching state of the switching means, the interconnection branch can be connected to the charging path and/or the discharging path in different ways. Such an interconnection can in principle take place in different modes, according to the disclosure a single-pole or dual-pole switchover between the charging path and the discharging path is conceivable. In principle, the bridge circuit can be any type of bridge circuit. According to the disclosure, the use of a half bridge, preferably a full bridge, is conceivable. With the help of the bridge circuit, it is preferably possible to connect the accumulator to the interconnection branch in different ways. It is thus conceivable according to the disclosure to connect the battery module with different polarities, or for the battery module to be bridged by means of the bridge circuit. In order to be able to control the bridge circuit in a suitable manner, the power supply system preferably has a control unit. The power supply system is preferably dimensioned to be quite compact. It is therefore preferably a portable/mobile power supply system that can be used variably, for example on construction sites, to provide electrical power.

It is preferred if the switching means selectively enables either the charging path or the discharging path to be connected to the interconnection branch. In other words, the switching means exclusively enables switching states in which all poles of the interconnection branch are connected either to the charging path or to the discharging path. Faults such as a connection of the charging path to the discharging path can thus be avoided. The switching means is particularly preferably designed in such a way that it galvanically separates the charging path from the discharging path at every operating time. This can be ensured by a suitable design of the switching means, which will be explained below.

It is advantageous if the switching means has at least one relay. A relay allows a remote-controlled change of a connection of the interconnection branch to the charging path or to the discharging path. In principle, the use of a wide variety of relay types is conceivable. It is particularly advantageous if the relay is a safety relay.

According to the disclosure, it can be provided that the power supply system has a locking circuit coupled to the at least one relay, which ensures that the charging path is separated from the interconnection branch when the at least one relay electrically conductively connects the discharging path to the interconnection branch, and which ensures that the discharging path is separated from the interconnection branch when the at least one relay electrically conductively connects the charging path to the interconnection branch. This ensures that the discharging path is galvanically isolated from the charging path at every operating time. To this end, the relays can have auxiliary contacts which are connected to one another in a suitable manner.

According to an advantageous embodiment of the disclosure, the switching means has two DPST relays with mirror contacts or one DPDT relay. A DPST relay only switches through in one switch position, while a DPDT relay switches through in both switch positions. Accordingly, DPST is defined as "Dual Pole, Single Throw" while DPDT stands for "Dual Pole, Double Throw". Designing the DPST relays with mirror contacts allows the DPST relays to be coupled, which ensures that they cannot connect the connected charging path or discharging path to the interconnection branch at the same time. The DPDT relay should preferably be designed as a safety relay with two openers and two closers, which are connected to one another by means of forced guidance. In this way, galvanic isolation can also be ensured, for example, in the case of single-pole switching faults.

The power supply system preferably has no isolating converter circuit between the interconnection branch and the charging path or the discharging path. Coupling the interconnection branch to the charging path and/or to the discharging path by means of a converter circuit would also ensure galvanic isolation of the interconnection branch from the charging path or from the discharging path, but according to the disclosure this should be achieved using an advantageous alternative design. In the present case, a converter circuit is to be understood to mean a circuit comprising at least one transformer.

It can be provided according to the disclosure that the charging path and the discharging path each have two branches. A branch is to be understood here in each case as a current path. The two branches can be coupled via the switching means to a two-terminal network formed by the interconnection branch.

The power supply system is preferably equipped with an input filter in the charging path and with an output filter in the discharging path, wherein the input filter has a comparatively high total inductance and is designed for comparatively low currents, and wherein the output filter has a comparatively low total inductance and is designed for comparatively high currents. The total inductance of the respective filter is to be understood as the total inductance thereof, regardless of whether the filter is implemented by one component or by a plurality of components. In the present case, it is possible to dimension the input filter and the output filter differently for the requirements when charging the power supply system on a public supply network or delivering power via the discharging path. By dividing the filters, weight and installation space can be saved, since otherwise a filter with a high total inductance would be required in the interconnection branch, which would also have to be designed for a high current.

The input filter and the output filter are preferably designed in such a way that disturbance variables, which are caused, for example, by switching processes in bridge circuits of the mobile power supply system, are suppressed as well as possible. The wording that the input filter or the output filter is designed for a certain current is to be understood as meaning that such a current can be applied continuously to the input filter or the output filter without undesirable effects generally occurring. Thus, it should be possible to apply this current continuously, at least until the power supply device has been fully charged or discharged, without thermal damage to components and/or current paths occurring. This can also be understood in such a way that a permanent application of this current is possible at least until the power supply device is fully charged or discharged, and without an inductive component of the respective filter at its peak (peak current) losing more than 50% of its nominal inductance.

The input filter particularly preferably has a total inductance that is at least twice as great as the total inductance of the output filter, and the output filter is designed for a current that is at least twice as great as the current for which the input filter is designed. It is also advantageous if the input filter has a total inductance that is at least four times greater than a total inductance of the output filter, and the output filter is designed for a current that is at least four times greater than a current for which the input filter is designed. According to one variant of the disclosure, the input filter has a total inductance of at least 200 pH, preferably at least 400 pH, and is designed for a maximum current of at most 8 A, preferably at most 6 A, and the output filter has a total inductance of a maximum of 100 pH, preferably a maximum 50 pH and is designed for a maximum current of at least 12 A, preferably at least 16 A. A corresponding design would be advantageous with an operating voltage of 230 V. However, depending on the operating voltage and possibly other parameters, a different design of the filter can also be selected.

The input filter is preferably implemented in an LC configuration or an LCL configuration. The LC configuration is preferably formed by an inductive and a capacitive component, while the LCL configuration is formed by two inductive components and one capacitive component. According to the disclosure, it is possible for the output filter to be implemented in an LC configuration. The output filter can therefore have the same design as the input filter, although the components in the discharging path and in the charging path should have different dimensions.

According to a particular embodiment of the disclosure, the power supply system has an input filter in the charging path and an output filter in the discharging path, wherein the output filter is designed without an inductive component, and wherein at least one inductive component is connected upstream of the battery modules in the interconnection branch. In contrast, the input filter preferably has an inductive component in this embodiment. Capacitive components of the input filter and the output filter are preferably arranged exclusively in the charging path or the discharging path, but not in the interconnection branch. In this embodiment of the disclosure, the input filter and the output filter can, so to speak, share the inductive component in the interconnection branch. Thus, since the output filter in the discharging path has no inductive component at all and the inductive component of the input filter can be dimensioned to save space, space can be saved.

An EMC filter, which has a comparatively high filter inductance and a comparatively high filter capacitance and is designed for comparatively low currents, is preferably arranged in the charging path, and an EMC filter, which has a comparatively low filter inductance and a comparatively low or no filter capacitance and is designed for comparatively high currents, is arranged in the discharging path. The filter inductances of the EMC filters are preferably formed by current-compensated chokes. They are therefore particularly suitable for damping interference emissions and, in particular, for suppressing common-mode interference.

It is advantageous if the filter inductance of the EMC filter in the charging path is at least twice as great as the filter inductance of the EMC filter in the discharging path and the filter capacitance of the EMC filter in the charging path is at least twice as great as the filter capacitance of the EMC filter in the discharging path. According to a possible variant of the disclosure, the EMC filter in the discharging path has a current-compensated choke of at most 1.5 mH and optionally a connection-side capacitance of at most 1.0 μF, while the EMC filter in the charging path has a current-compensated choke of at least 3.0 mH and a terminal-side capacitance of at least 2.0 μF. On the connection side, that side of the EMC filter is arranged that faces the connections of the charging or discharging path, i.e. the connection of the charging path via which it can be connected to a supply network, for example, and the connection of the discharging path via which it can be connected, for example, to a consumer.

It is advantageous if the EMC filter in the discharging path is designed for a current that is at least twice as great, alternatively at least four times as great, as that of the EMC filter in the charging path. Preferably, the EMC filter in the discharging path is designed for a current of at least 18 A and the EMC filter in the charging path is designed for a current of at most 4.5 A. According to a further advantageous variant of the disclosure, the EMC filter in the discharging path is designed for a current of at least 15 A and the EMC filter in the charging path is designed for a current of at most 7.5 A. Due to their different design, the EMC filters better meet the requirements in the charging and discharging paths.

It is possible according to the disclosure for a current measuring device which is designed for a comparatively low maximum measured current to be arranged in the charging path and for a current measuring device which is designed for a comparatively high maximum measured current to be arranged in the discharging path. It is therefore not necessary to provide a common current measuring device in the interconnection branch which can measure both a comparatively high maximum measured current and a comparatively low measured current with sufficient accuracy. The maximum measured current is determined by the nominal measuring range of the respective current measuring device.

It is advantageous if the maximum measured current of the current measuring device in the discharging path is at least five times greater than the maximum measured current of the current measuring device in the charging path. It is particularly advantageous if the maximum measured current of the current measuring device in the discharging path is at least ten times greater than the maximum measured current of the current measuring device in the charging path. According to one embodiment of the disclosure, the maximum measured current of the current measuring device in the charging path can be at most 15 A, while the maximum measured current of the current measuring device in the discharging path is at least 75 A. According to a further embodiment of the disclosure, the maximum measured current of the current measuring device in the charging path is at most 10 A, while the maximum measured current of the current measuring device in the discharging path is at least 100 A.

It is also advantageous if a voltage measuring device is arranged in the interconnection branch. The voltage measuring device can be used to measure both a charging voltage and a voltage that the power supply system provides via the discharging path. Due to the generally comparable requirements for the voltage measuring device during the charging process and during the discharging process, preferably only this one voltage measuring device is provided in the power supply system. However, variants of the disclosure are also conceivable in which additional voltage measuring devices are used, which can be arranged, for example, in the charging path or in the discharging path.

According to a further variant of the disclosure, the power supply system is set up to check power supplied from an external power source via the charging path to the interconnection branch for at least one first fault characteristic and to switch off when the first fault characteristic is detected. This ensures that the power supply system is switched off in the event of faults during charging. It is possible according to the disclosure for the first fault characteristic to be selected from the group comprising the presence of an overcurrent, the presence of an overvoltage, a voltage rise rate being exceeded, a voltage drop rate being exceeded and a voltage frequency being exceeded or undershot. In principle, however, a check for the presence of other fault characteristics is also conceivable.

According to the disclosure, the power supply system can be set up to check for at least one second fault characteristic when electrical power is delivered via the discharging path, and to switch off when the second fault characteristic is detected. This ensures that the power supply system is switched off in the event of faults during discharging. It is preferred if the second fault characteristic is selected from the group comprising the presence of an overcurrent, the presence of an overload, the presence of a current reverse flow and the presence of an excessive reactive power. In principle, however, a check for the presence of other fault characteristics is also conceivable.

A rectifier bridge is preferably arranged in the charging path. In this way, it is possible to prevent the power supply system from feeding electrical power into a supply network, from which it is intended that electrical power should be drawn only in the event of a fault. It is also advantageous if at least one first overcurrent protection device is arranged in the charging path, wherein at least one second overcurrent protection device is arranged in the discharging path, and wherein a tripping current of the at least one second overcurrent protection device is at least twice as great as a tripping current of the at least one first overcurrent protection device. According to another variant of the disclosure, it can be provided that the tripping current of the first overcurrent protection device is at most 8 A and the tripping current of the second overcurrent protection device is at least 15 A. An overcurrent protection device within the meaning of this disclosure is to be understood as meaning an electrical fuse, in particular a circuit breaker or the like.

The power supply system is preferably designed in such a way that it allows the charging path to be electrically connected to the discharging path if the discharging path is not connected to the interconnection branch. Thus, in special cases, the charging path can be electrically conductively connected to the discharging path or the interconnection branch is bridged. This can be used, for example, to supply electrical power to a consumer connected to the power supply system via a supply network to which the power supply system is also connected. According to an advantageous embodiment of the disclosure, a switching device such as a relay can be provided to bridge the interconnection branch.

BRIEF DESCRIPTION OF THE DRAWINGS

Advantageous variants of the disclosure are shown as examples in the drawings. In the drawings.

DETAILED DESCRIPTION OF THE DRAWINGS

Figures 1, 2, 3:
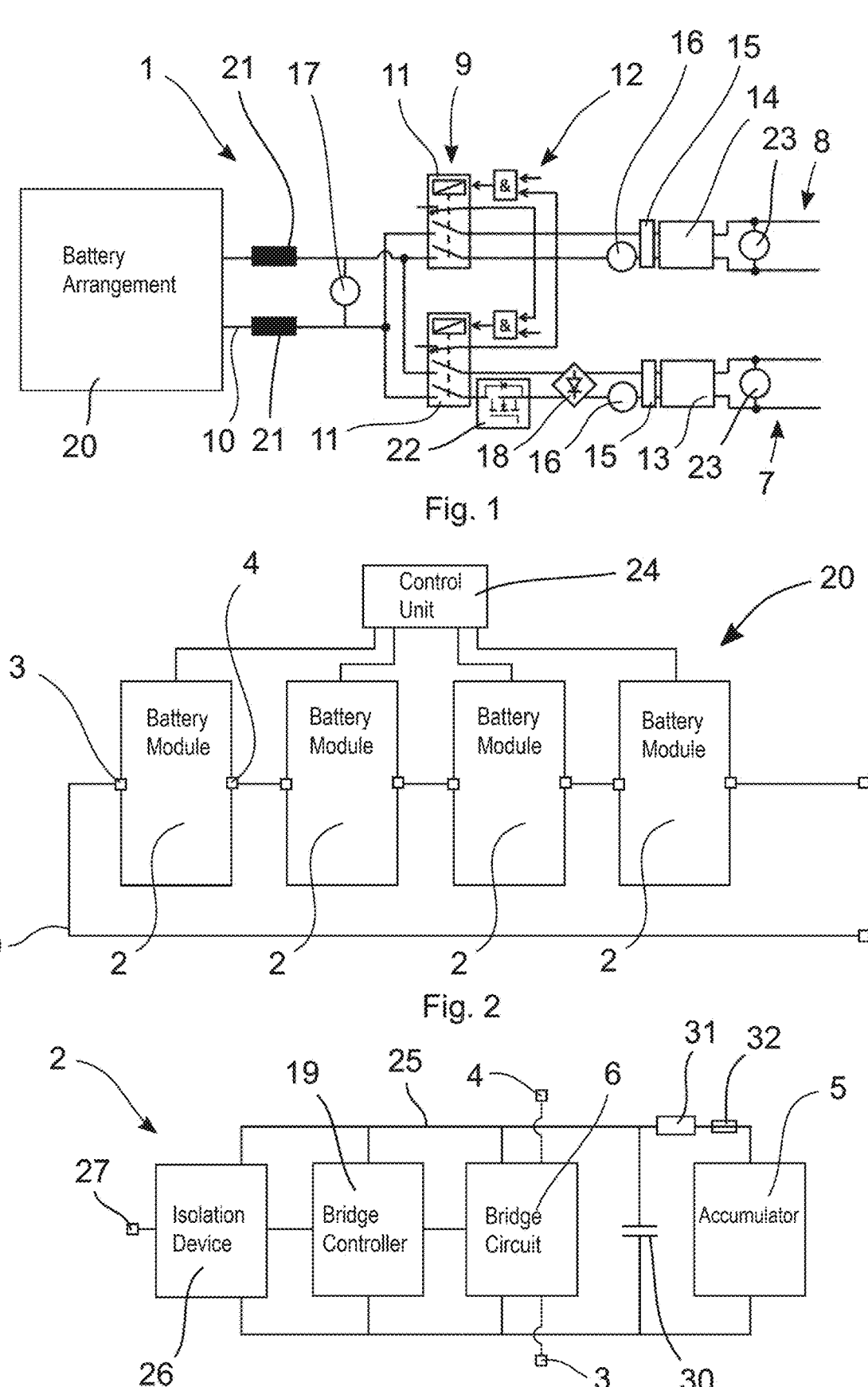
FIG. 1 is a schematic representation of a variant of the power supply system according to the disclosure.
FIG. 2 is a schematic representation of a battery arrangement of the power supply system according to FIG. 1.
FIG. 3 is a schematic representation of a battery module of the battery arrangement according to FIG. 2.

FIG. 1 is a schematic representation of a variant of the power supply system 1 according to the disclosure. The power supply system 1 has a charging path 7 and a discharging path 8. The charging path 7 can be connected to a supply network, for example, so that the power supply system 1 can be charged. The supply network provides an AC voltage. The discharging path 8 can be connected to a consumer which can draw electrical power from the power supply system 1 via the discharging path 8. The power supply system 1 can provide an AC voltage. A battery arrangement 20 of the power supply system 1 contains accumulators which are used to store electrical power. The accumulators are arranged in an interconnection branch 10.

A switching means 9 which has two relays 11 can selectively connect the charging path 7 or the discharging path 8 to the interconnection branch 10. The power supply system 1 also has a locking circuit 12. This ensures that either the charging path 7 or the discharging path 8 is connected to the interconnection branch 10 at any time, but never both paths at the same time. Thus, a galvanic isolation between the charging path 7 and the discharging path 8 is always guaranteed.

The division into a charging path 7 and a discharging path 8 allows adapted dimensioning of various components. An input filter 13 is arranged in the charging path 7 and an output filter 14 is arranged in the discharging path 8, and these filters are specially adapted to the respective requirements in the charging path 7 and in the discharging path 8. The output filter 14 is designed without an inductive component 21. In contrast, the input filter 13 has an inductive component 21. In order to complement the filter effect of the input filter 13 and the output filter 14, inductive components 21 assigned to them are arranged in the interconnection branch, these components being shared, so to speak, by the input filter 13 and the output filter 14. Furthermore, the power supply system 1 also has EMC filters 15 in the charging path 7 and the discharging path 8 that are specially adapted to the requirements in the respective paths. The different dimensioning of components also affects current measuring devices 16 of the power supply system 1, which are arranged in the charging path 7 and the discharging path 8, respectively. The current measuring device 16 in the charging path 7 is designed for a comparatively low maximum measured current, and the current measuring device 16 in the discharging path 8 is designed for a comparatively high maximum measured current. On the other hand, regardless of whether the charging path 7 or the discharging path 8 is connected to the circuit branch 10, a voltage measuring device 17 arranged in the interconnection branch 10 is used.

Furthermore, the power supply system 1 has a rectifier bridge 18 which is arranged in the charging path 7. The rectifier bridge 18 can be used to prevent electrical power from flowing back into the supply network from the power supply system 1 via the charging path 7. The power supply system 1 is also equipped with a switch 22 which is arranged in the charging path 7 and, if required, can disconnect the interconnection branch 10 from the supply network with little delay, for example in the event of voltage peaks or certain faults. A voltage directly at the supply network or at the consumer can be measured using additional voltage measuring devices 23 in the charging path 7 and the discharging path 8.

FIG. 2 shows a schematic representation of the battery arrangement 20 of the power supply system according to FIG. 1. A large number of battery modules 2 are arranged in the battery arrangement 20. These are connected in series in the interconnection branch 10. Each battery module 2 has a first electrical connection 3 and a second electrical connection 4 via which the relevant battery module 2 is connected to the interconnection branch 10. A control unit 24 of the power supply system controls the battery modules 2 in a suitable manner during a discharging process, so that the total voltages thereof result in an approximately sinusoidal AC voltage. During a charging process, the control unit 24 controls the battery modules 2 in such a way that accumulators in the battery modules 2 are always connected to a voltage with the correct polarity and can therefore be charged.

FIG. 3 is a schematic representation of one of the battery modules 2 of the battery arrangement according to FIG. 2. The battery module 2 has an accumulator 5 which can be electrically charged and discharged. The battery module 2 also has a bridge circuit 6 which is connected to the first electrical connection 3 and the second electrical connection 4 of the battery module 2. The bridge circuit 6 can assume different switching states. For example, it can change a polarity with which the first electrical connection 3 and the second electrical connection 4 of the battery module 2 are connected to an inner branch 25 of the battery module 2. The bridge circuit 6 can also bridge the inner branch 25. A large number of battery modules 2 arranged in series can thus provide an AC voltage by a suitable change in the switching states. It is also possible to charge the accumulator 5 even though the charging path of the power supply system is connected to an AC voltage source. The battery module 2 also has an isolation device 26. This isolates an interior of the battery module 2 galvanically from a control terminal 27 of the battery module 2 and contains an optocoupler for this purpose. Alternatively, a digital isolator could be used instead of the optocoupler.

A bridge controller 19 of the battery module 2 receives a signal generated by the control unit which indicates a desired switching state. This signal is fed to the bridge controller 19 from the control terminal 27 via the isolation device 26. Depending on the signal, the bridge controller 19 controls the bridge circuit 6 in such a way that the switching state specified by the signal is set. A capacitor 30 is arranged in the inner branch 25. A separating device 31 in the inner branch 25 makes it possible to separate the accumulator 5 from the inner branch 25 if necessary. Furthermore, a fuse 32, which causes a disconnection of the accumulator 5 from the inner branch 25 in the event of an overcurrent, is provided in the inner branch 25.

Figure 4:
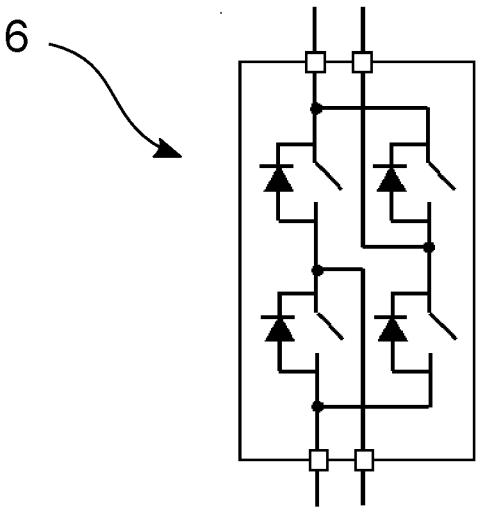
FIG. 4 is a schematic representation of a bridge circuit of the battery module according to FIG. 3.

FIG. 4 shows a schematic representation of the bridge circuit 6 of the battery module according to FIG. 3. This is a full bridge, which means that a particularly large number of switching states can be enabled. According to other embodiments of the disclosure, however, a half-bridge can also be used, for example.

Figure 5:
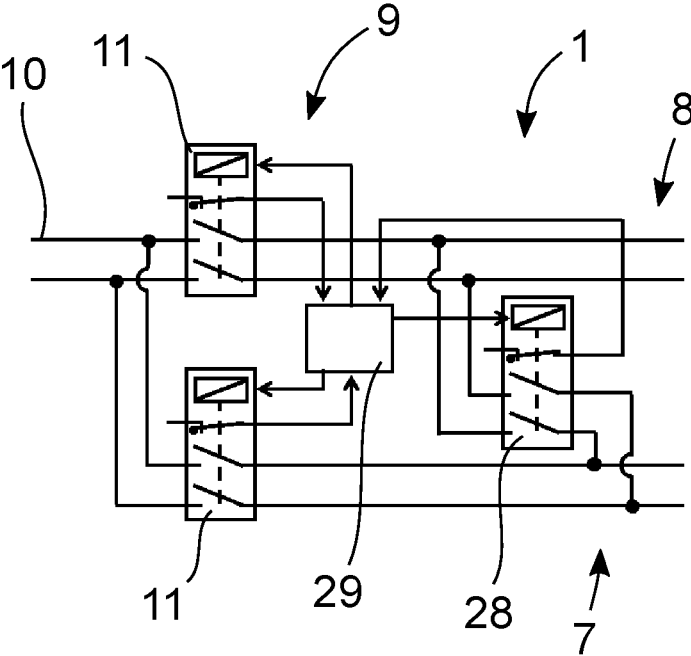
FIG. 5 is a schematic representation of a second variant of the power supply system according to the disclosure.

FIG. 5 shows a schematic representation of a second variant of the power supply system 1 according to the disclosure. A part of the power supply system 1 is shown, in which an interconnection branch 10 of the power supply system 1 can be coupled to a charging path 7 and to a discharging path 8 of the power supply system via a switching means 9 which has two relays 11. The switching means 9 makes it possible to selectively connect either the charging path 7 or the discharging path 8 to the interconnection branch 10. A switching relay 28 of the power supply system 1 makes it possible to connect the charging path 7 directly to the discharging path 8. If a consumer is connected to the power supply system 1 and the power supply system 1 is also connected to a supply network, the consumer can be fed either by means of the battery modules of the power supply module or from the supply network. A switching controller 29 ensures that the switching means 9 and the switching relay 28 cannot assume any impermissible switching states.

The invention claimed is:

1. A power supply system comprising:
a plurality of battery modules, wherein each battery module has a first electrical connection and a second electrical connection, via which the battery modules are connected in series in an interconnection branch of the power supply system, wherein each battery module also has an accumulator configured to be connected via a bridge circuit of the battery module to the first electrical connection and the second electrical connection, and
a charging path via which the power supply system is configured to be charged, and
a discharging path via which the power supply system is configured to deliver electrical power to a connected consumer, wherein the discharging path is separate from the charging path,
wherein the power supply system has a switching means to which the charging path, the discharging path and the interconnection branch are connected, and wherein the switching means is configured to connect the charging path electrically conductively to the interconnection branch when the power supply system is to be charged and to connect the discharging path electrically conductively to the interconnection branch when the power supply system is to deliver electrical power to the connected consumer.

2. The power supply system according to claim 1, wherein the switching means selectively enables either the charging path or the discharging path to be connected to the interconnection branch.

3. The power supply system according to claim 2, wherein the switching means galvanically separates the charging path from the discharging path at every operating time.

4. The power supply system according to claim 1, wherein the switching means has at least one relay.

5. The power supply system according to claim 4, wherein the power supply system has a locking circuit coupled to the at least one relay, which ensures that the charging path is separated from the interconnection branch when the at least one relay electrically conductively connects the discharging path to the interconnection branch, and which ensures that the discharging path is separated from the interconnection branch when the at least one relay electrically conductively connects the charging path to the interconnection branch.

6. The power supply system according to claim 1, wherein the switching means has two dual pole, single throw (DPST) relays with mirror contacts or one dual pole, double throw (DPDT) relay.

7. The power supply system according to claim 1, wherein the power supply system has no isolating converter circuit between the interconnection branch and the charging path or the discharging path.

8. The power supply system according to claim 1, wherein the charging path and the discharging path each have two branches.

9. The power supply system according to claim 1, wherein the power supply system has an input filter in the charging path and an output filter in the discharging path, wherein the input filter has a comparatively high total inductance and is designed for comparatively low currents, and wherein the output filter has a comparatively low total inductance and is designed for comparatively high currents.

10. The power supply system according to claim 9, wherein the input filter has a total inductance that is at least twice as great as the total inductance of the output filter, and the output filter is designed for a current that is at least twice as great as the current for which the input filter is designed.

11. The power supply system according to claim 9, wherein the input filter has a total inductance which is at least four times greater than a total inductance of the output filter, and wherein the output filter is designed for a current that is at least four times greater than a current for which the input filter is designed.

12. The power supply system according to claim 9, wherein the input filter is implemented in an inductor-capacitor (LC) configuration or an inductor-capacitor-inductor (LCL) configuration.

13. The power supply system according to claim 9, wherein the output filter is implemented in an inductor-capacitor (LC) configuration.

14. The power supply system according to claim 1, wherein the power supply system has an input filter in the charging path and an output filter in the discharging path, wherein the output filter is designed without an inductive component, and wherein at least one inductive component is connected upstream of the battery modules in the interconnection branch.

15. The power supply system according to claim 1, wherein an electromagnetic compatibility (EMC) filter, which has a comparatively high filter inductance and a comparatively high filter capacitance and is designed for comparatively low currents, is arranged in the charging path, and an EMC filter, which has a comparatively low filter inductance and a comparatively low or no filter capacitance and is designed for comparatively high currents, is arranged in the discharging path.

16. The power supply system according to claim 15, wherein the filter inductance of the EMC filter in the charging path is at least twice as great as the filter inductance of the EMC filter in the discharging path and the filter capacitance of the EMC filter in the charging path is at least twice as great as the filter capacitance of the EMC filter in the discharging path.

17. The power supply system according to claim 15, wherein the EMC filter in the discharging path is designed for a current that is at least twice as great as that of the EMC filter in the charging path.

18. The power supply system according to claim 15, wherein the EMC filter in the discharging path is designed for a current which is at least four times greater than that of the EMC filter in the charging path.

19. The power supply system according to claim 15, wherein the filter inductances of the EMC filters are formed by current-compensated chokes.

20. The power supply system according to claim 1, wherein a current measuring device which is designed for a comparatively low maximum measured current is arranged in the charging path, and in that a current measuring device which is designed for a comparatively high maximum measured current is arranged in the discharging path.

21. The power supply system according to claim 20, wherein the maximum measured current of the current measuring device in the discharging path is at least five times greater than the maximum measured current of the current measuring device in the charging path.

22. The power supply system according to claim 1, wherein a voltage measuring device is arranged in the interconnection branch.

23. The power supply system according to claim 1, wherein the power supply system is set up to check electrical power supplied from an external power source via the charging path to the interconnection branch for at least one first fault characteristic and to switch off when the first fault characteristic is detected.

24. The power supply system according to claim 23, wherein the first fault characteristic is selected from the group consisting of presence of an overcurrent, presence of an overvoltage, a voltage rise rate being exceeded, a voltage drop rate being exceeded, and a voltage frequency being exceeded or undershot.

25. The power supply system according to claim 1, wherein the power supply system is set up to check for at least one second fault characteristic when electrical power is delivered via the discharging path, and to switch off when the second fault characteristic is detected.

26. The power supply system according to claim 25, wherein the second fault characteristic is selected from the group consisting of presence of an overcurrent, presence of an overload, the presence of a current reverse flow, and the presence of an excessive reactive power.

27. The power supply system according to claim 1, wherein a rectifier bridge is arranged in the charging path.

28. The power supply system according to claim 1, wherein at least one first overcurrent protection device is arranged in the charging path, wherein at least one second overcurrent protection device is arranged in the discharging path, and wherein a tripping current of the at least one second overcurrent protection device is at least twice as great as a tripping current of the at least one first overcurrent protection device.

29. The power supply system according to claim 1, wherein the power supply system is configured such that the power supply system allows the charging path to be electrically connected to the discharging path if the discharging path is not connected to the interconnection branch.

* * * * *